United States Patent
Choi et al.

(10) Patent No.: US 10,397,818 B2
(45) Date of Patent: *Aug. 27, 2019

(54) APPARATUS AND METHOD FOR TRANSMITTING CHANNEL STATE INFORMATION IN A WIRELESS COMMUNICATION SYSTEM

(71) Applicant: LG ELECTRONICS INC., Seoul (KR)

(72) Inventors: Young Seob Choi, Anyang-si (KR); Hak Seong Kim, Anyang-si (KR); Han Byul Seo, Anyang-si (KR); Ki Jun Kim, Anyang-si (KR); Dae Won Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 45 days.

This patent is subject to a terminal disclaimer.

(21) Appl. No.: 15/286,488

(22) Filed: Oct. 5, 2016

(65) Prior Publication Data

US 2017/0094548 A1 Mar. 30, 2017

Related U.S. Application Data

(63) Continuation of application No. 13/386,020, filed as application No. PCT/KR2010/004765 on Jul. 21, 2010, now Pat. No. 9,491,648.

(Continued)

(30) Foreign Application Priority Data

Oct. 9, 2009 (KR) .................. 10-2009-0096212

(51) Int. Cl.
*H04W 24/10* (2009.01)
*H04W 28/04* (2009.01)
(Continued)

(52) U.S. Cl.
CPC ........... *H04W 24/10* (2013.01); *H04L 1/0026* (2013.01); *H04L 5/0057* (2013.01);
(Continued)

(58) Field of Classification Search
CPC ..... H04L 1/1812; H04L 5/0053; H04L 5/001; H04W 72/0446; H04W 72/0413;
(Continued)

(56) References Cited

U.S. PATENT DOCUMENTS 7,522,563 B2 4/2009 Rhee
2004/0253955 A1 12/2004 Love et al.
(Continued)

FOREIGN PATENT DOCUMENTS

CN 101300767 11/2008
CN 101426225 A 5/2009
(Continued)

OTHER PUBLICATIONS

Texas Instruments, "On Remaining Issues of PUCCH CQI Reports," 3GPP TSG RAN WG1 #55, R1-084441, Nov. 2008, 8 pages.
(Continued)

*Primary Examiner* — Un C Cho
*Assistant Examiner* — Peter K Mak
(74) *Attorney, Agent, or Firm* — Lee, Hong, Degerman, Kang & Waimey

(57) ABSTRACT

An apparatus and method for transmitting channel state information in a wireless communication system are disclosed. The UE apparatus for transmitting channel state information includes a channel state measurement module for measuring a channel state based on a level of interference received from a neighbor cell, a channel state information generation module for generating channel state information for a plurality of resource regions or for periodic and aperiodic channel state information reporting modes using
(Continued)

the measured channel state and offsets received from a serving BS, the offsets being set for the plurality of resource regions or the periodic and aperiodic channel state information reporting modes, and a transmission module for transmitting the generated channel state information to the serving BS.

8 Claims, 17 Drawing Sheets

Related U.S. Application Data

(60) Provisional application No. 61/327,075, filed on Apr. 22, 2010, provisional application No. 61/289,394, filed on Dec. 23, 2009, provisional application No. 61/264,839, filed on Nov. 30, 2009, provisional application No. 61/227,074, filed on Jul. 21, 2009.

(51) Int. Cl.
    *H04L 5/00*         (2006.01)
    *H04L 25/02*       (2006.01)
    *H04L 1/00*         (2006.01)
    *H04W 72/04*      (2009.01)

(52) U.S. Cl.
    CPC ........ *H04L 5/0053* (2013.01); *H04L 25/0202* (2013.01); *H04W 28/04* (2013.01); *H04W 72/0413* (2013.01)

(58) Field of Classification Search
    CPC ... H04W 72/042; H04B 7/066; H04B 7/0632; H04B 7/0639; H04B 7/024
    See application file for complete search history.

(56) References Cited

U.S. PATENT DOCUMENTS

| | | | |
|---|---|---|---|
| 2007/0098098 A1 | 5/2007 | Xiao et al. | |
| 2007/0254658 A1 | 11/2007 | Fabien et al. | |
| 2009/0059844 A1 | 3/2009 | Ko et al. | |
| 2009/0168718 A1 | 7/2009 | Wang et al. | |
| 2009/0245169 A1 | 10/2009 | Zhang et al. | |
| 2010/0098012 A1* | 4/2010 | Bala ................. | H04L 5/001 370/329 |
| 2010/0113057 A1 | 5/2010 | Englund et al. | |
| 2010/0220675 A1 | 9/2010 | Chun et al. | |
| 2010/0271970 A1* | 10/2010 | Pan ................... | H04L 1/0026 370/252 |
| 2011/0032895 A1 | 2/2011 | Englund et al. | |
| 2011/0141928 A1* | 6/2011 | Shin .................. | H04L 1/0028 370/252 |
| 2011/0142144 A1 | 6/2011 | Allpress et al. | |
| 2011/0211504 A1* | 9/2011 | Feuersanger ........ | H04L 1/0026 370/310 |
| 2011/0242982 A1 | 10/2011 | Lunttila et al. | |
| 2012/0033628 A1 | 2/2012 | Eriksson et al. | |
| 2012/0134275 A1 | 5/2012 | Choi et al. | |

FOREIGN PATENT DOCUMENTS

| | | |
|---|---|---|
| EP | 1542490 | 6/2005 |
| EP | 2028906 | 2/2009 |
| EP | 2037595 | 3/2009 |
| JP | 2006-135440 | 5/2006 |
| JP | 2007-129405 | 5/2007 |
| JP | 2008-054125 | 3/2008 |
| KR | 1020060080519 | 7/2006 |
| KR | 10-2007-0014720 A | 2/2007 |
| KR | 1020070014720 | 2/2007 |
| KR | 1020070027845 | 3/2007 |
| RU | 2378758 C2 | 1/2010 |
| WO | 2005/048533 | 5/2005 |
| WO | 2006/126080 | 11/2006 |
| WO | 2007/145557 | 12/2007 |
| WO | 2008022243 | 2/2008 |
| WO | 2008/115111 | 9/2008 |
| WO | 2008/116027 | 9/2008 |
| WO | 2009002097 | 12/2008 |
| WO | 2009022970 | 2/2009 |
| WO | 2009023860 | 2/2009 |
| WO | 2009/045139 | 4/2009 |
| WO | 2009/051456 | 4/2009 |
| WO | 2009051145 | 4/2009 |
| WO | 2009058809 | 5/2009 |
| WO | 2009/088225 | 7/2009 |
| WO | 2009/088739 | 7/2009 |

OTHER PUBLICATIONS

LG Electronics, et al., "Clarification on subband indexing in periodic CQI reporting," 3GPP TSG-RAN-WG1 Meeting #57bis, R1-092975, Jun. 2009, 5 pages.
InterDigital Communications, LLC, "Procedures for collisions between periodic and aperiodic CQI/PMI/RI reports and Draft CR to 36.213," 3GPP TSG RAN WG1 Meeting #53bis, R1-082523, Jun. 2008, 12 pages.
IP Australia Application Serial No. 2014253535, Office Action dated Jan. 29, 2016, 5 pages.
Russian Federation Federal Service for Intellectual Property, Patents and Trademarks Application Serial No. 2012106119/07, Notice of Allowance dated Aug. 6, 2013, 8 pages.
The State Intellectual Property Office of the People's Republic of China Application Serial No. 201080033394.0, Office Action dated Jan. 30, 2014, 7 pages.
Canadian Intellectual Property Office Application Serial No. 2,768,839, Office Action dated Nov. 27, 2013, 2 pages.
State Intellectual Property Office of the People's Republic of China Application Serial No. 201410638708.X, Office Action dated May 3, 2017, 10 pages.
Russian Federation Federal Service for Intellectual Property, Patents and Trademarks Application Serial No. 2012106119/07, Office Action dated Dec. 5, 2012, 7 pages.
European Search Report issued in Application No. 10802456.3, dated Aug. 9, 2016, 12 pages.
Sharp, "Impact of the PMI/RI Report Drop on the PUCCH CQI Report," 3GPP TSG RAN WG1 Meeting #53bis, R1-082273, Warsaw, Poland, Jun. 30-Jul. 4, 2008, 4 pages.
Huawei, "Correction on CQI reporting," 3GPP TSG-RAN-WG1 Meeting #56bis, R1-091652, Seoul, South Korea, Mar. 23-27, 2009, 11 pages.
IP Australia Application Serial No. 2010275184, Office Action dated May 30, 2013, 5 pages.
Panasonic, "Correction to PUCCH CQI/RI Transmission Timing" 3GPP TSG-RAN WG1 Meeting 55, R1-084238, Nov. 10-14, 2008, 2 pages.
Samsung, "CSI Signaling in LTE-A," 3GPP TSG-RAN WG1 #57, R1-091876, May 2009, 3 pages.
Sharp, "Control Overhead Analysis on Aperiodic PUSCH," 3GPP TSG-RAN WG1 #57bis, R1-092338, Jun. 2009, 15 pages.

* cited by examiner

[Fig. 1]

[Fig. 5]
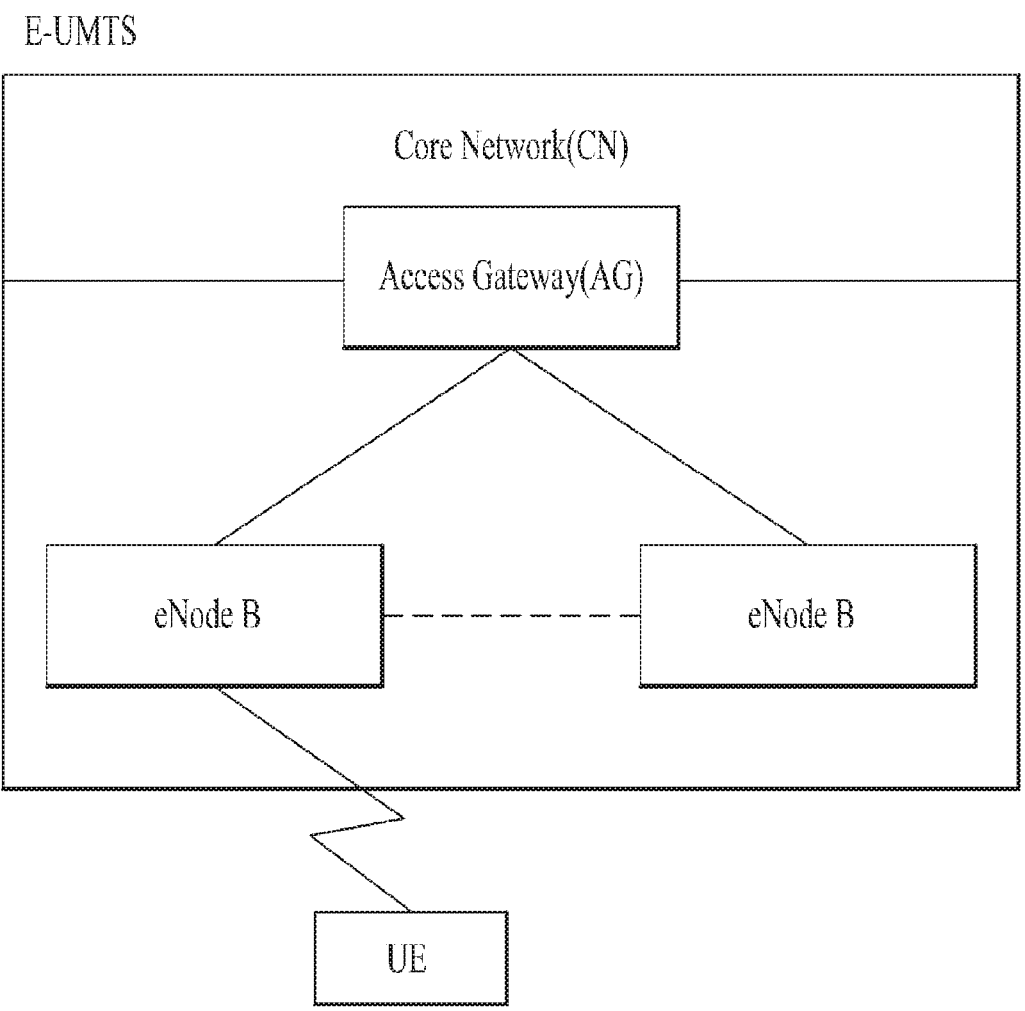

[Fig. 6]
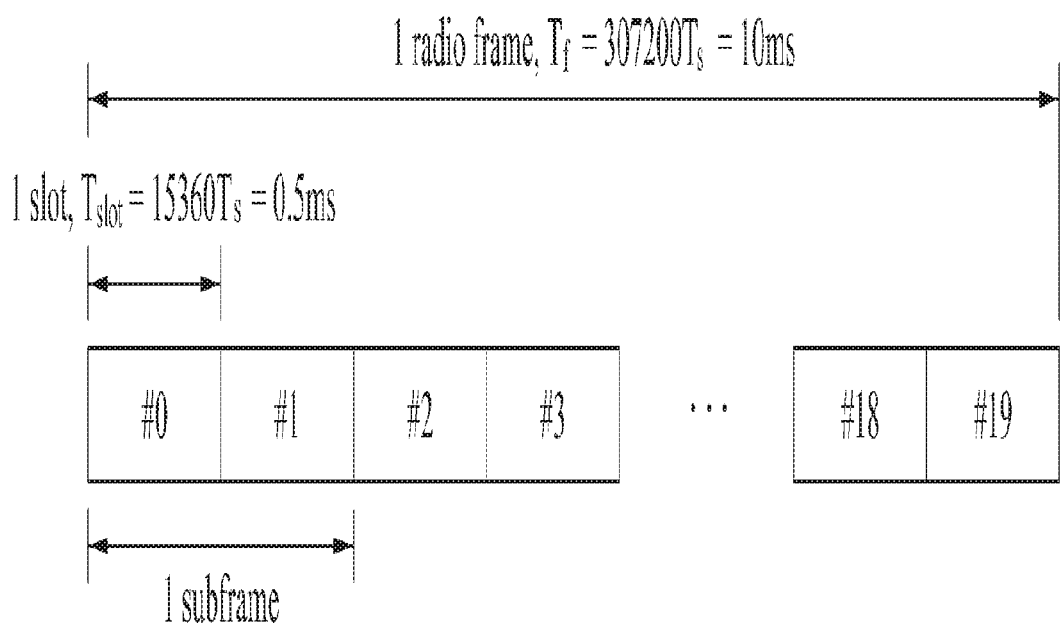

[Fig. 7]
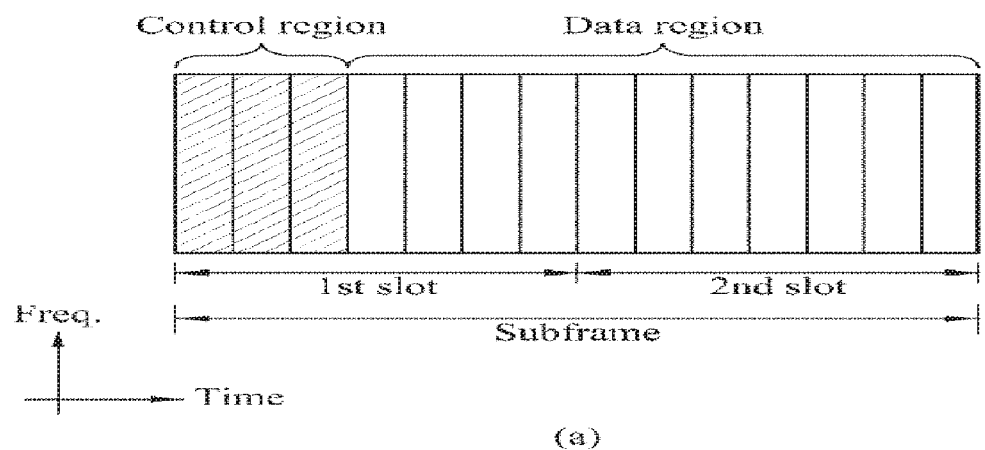
(a)
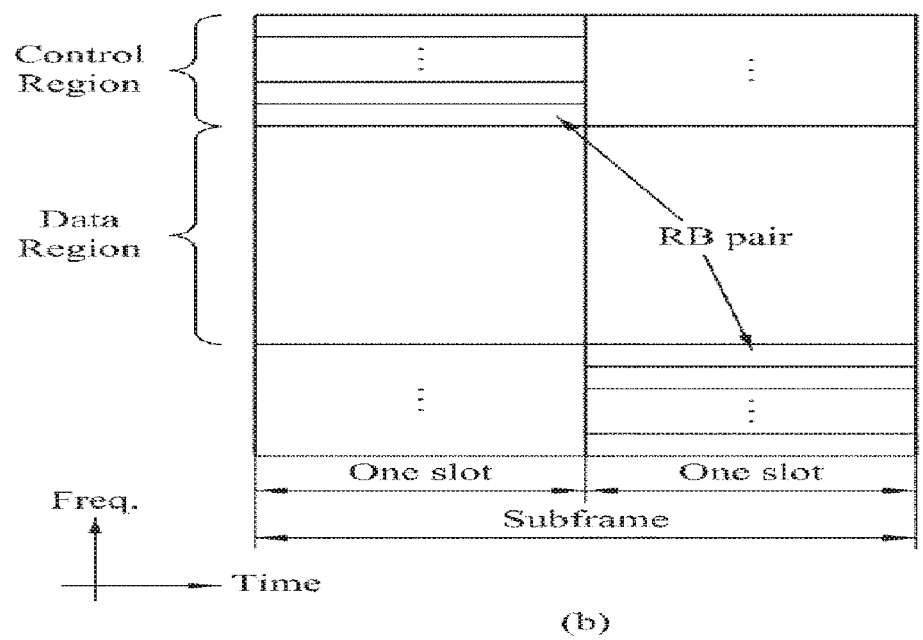
(b)

[Fig. 8]
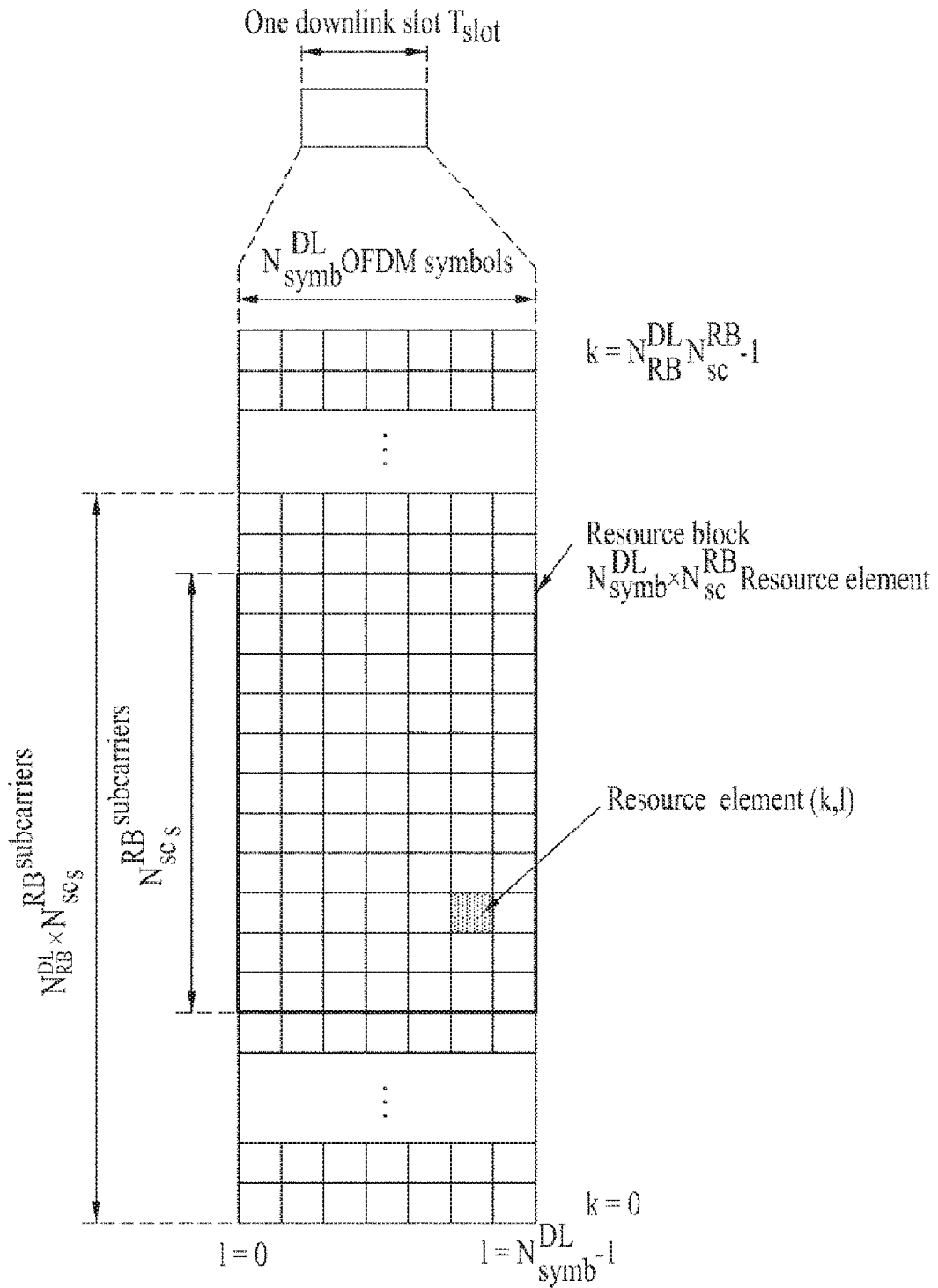

[Fig. 9]
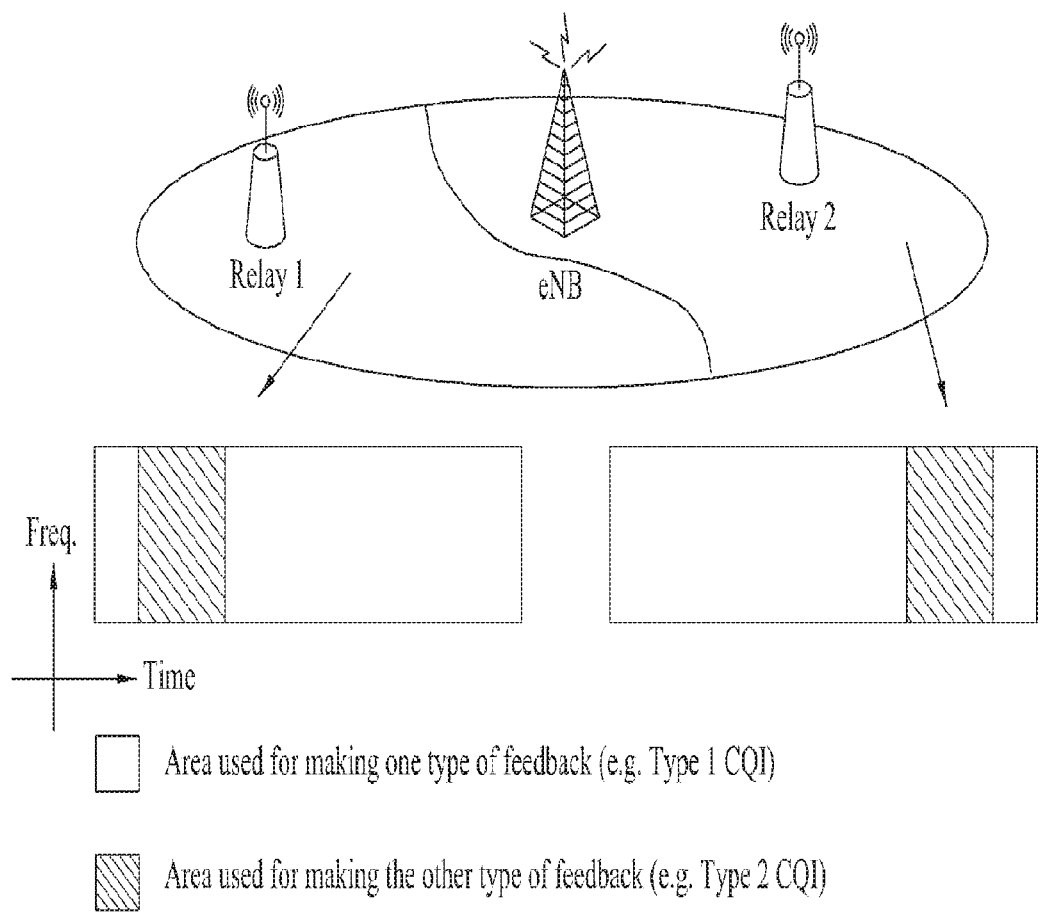

[Fig. 10]
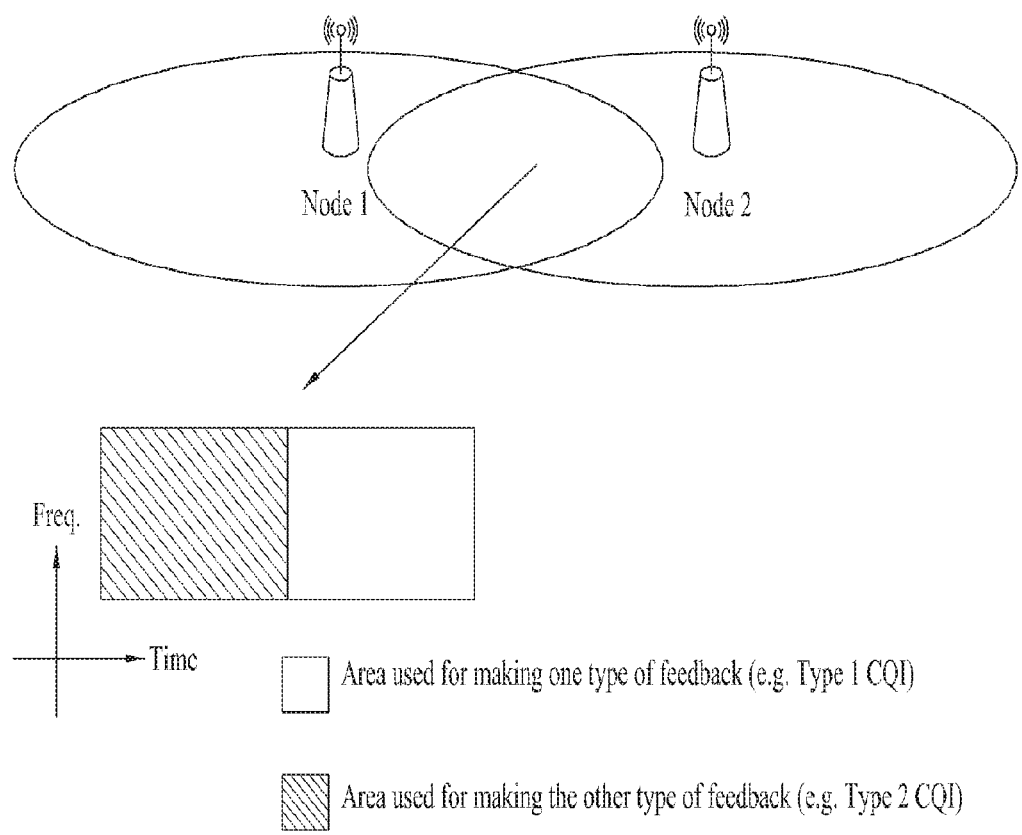

[Fig. 11]
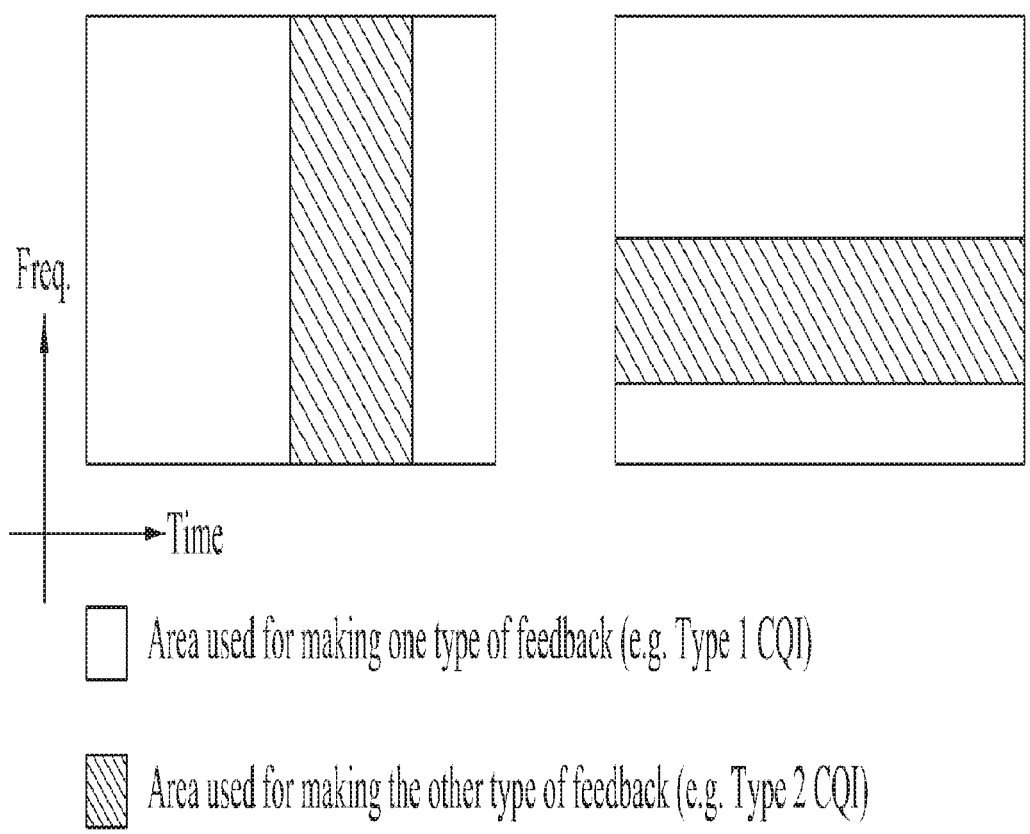

[Fig. 12]
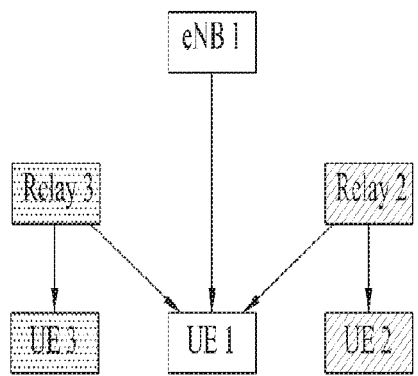
(a)
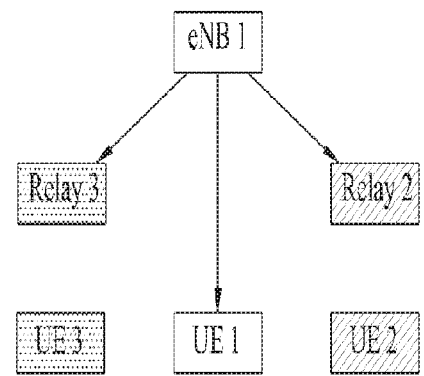
(b)
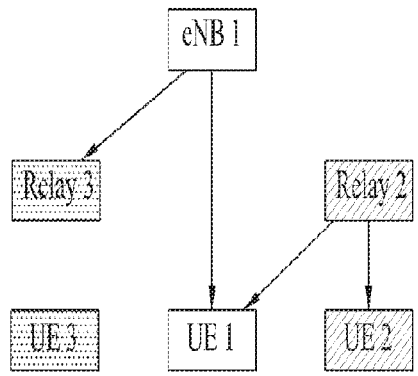
(c)
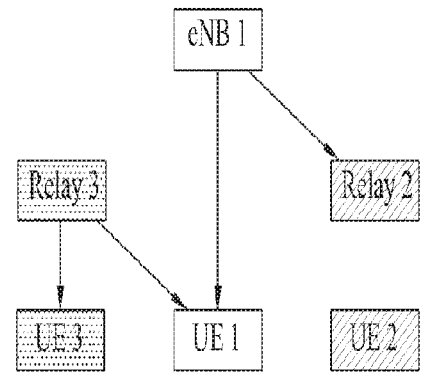
(d)

[Fig. 13]
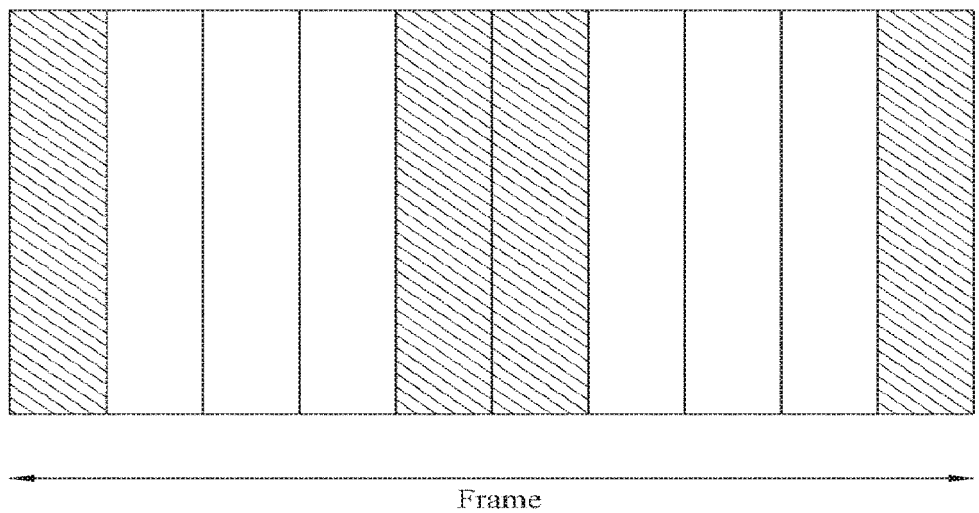
Frame
 Subframes used for making one type of feedback (e.g. Type 1 CQI)
 Subframes used for making the other type of feedback (e.g. Type 2 CQI)

[Fig. 14]
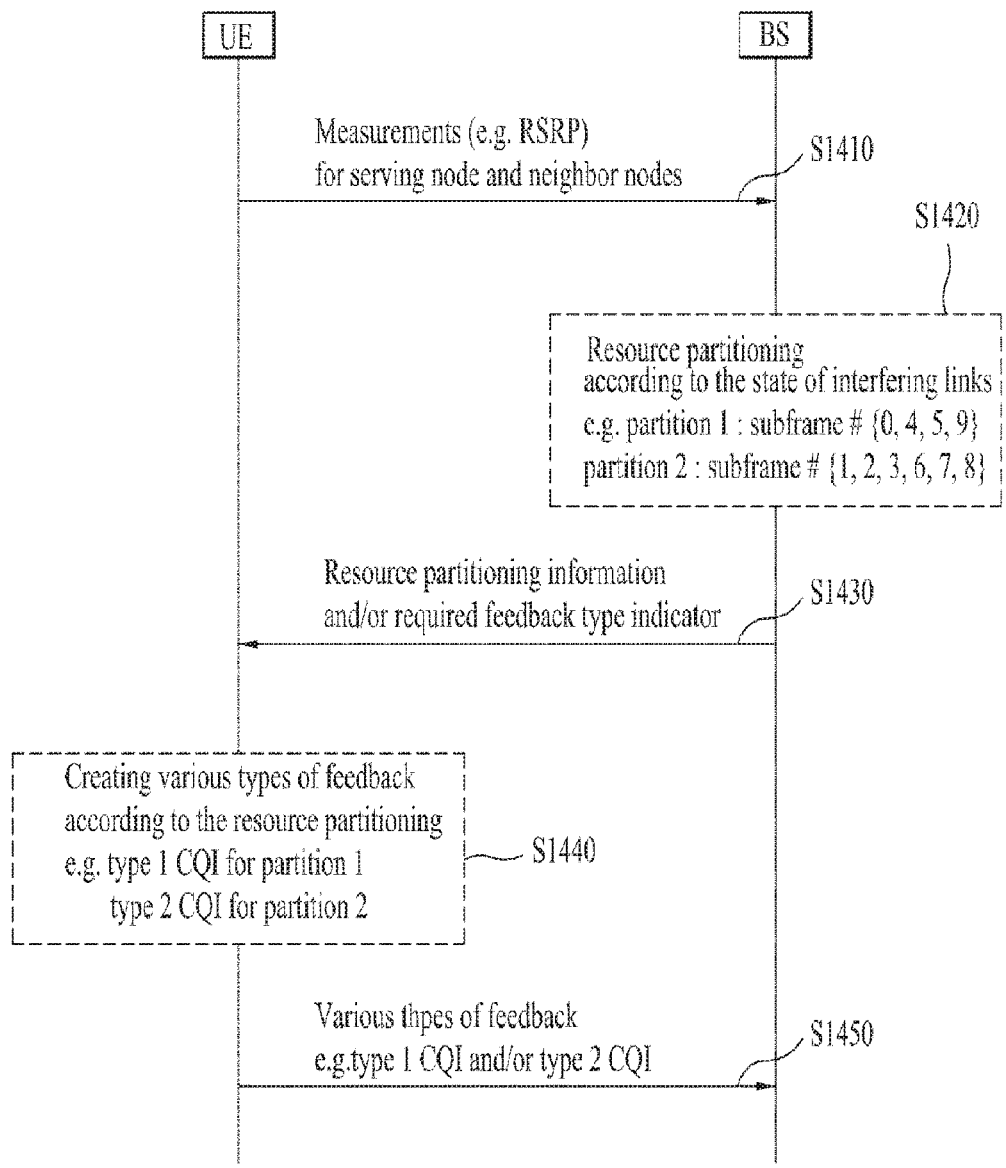

[Fig. 17]
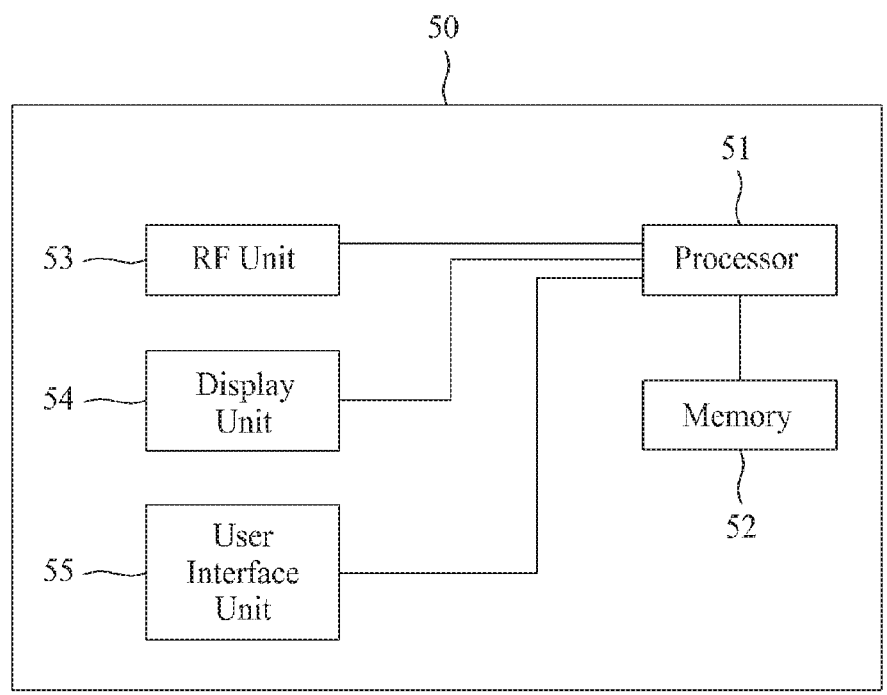

APPARATUS AND METHOD FOR TRANSMITTING CHANNEL STATE INFORMATION IN A WIRELESS COMMUNICATION SYSTEM

CROSS-REFERENCE TO RELATED APPLICATIONS

This application is continuation of U.S. application Ser. No. 13/386,020, filed on Jan. 19, 2012, now U.S. Pat. No. 9,491,648, which is the National Stage filing under 35 U.S.C. 371 of International Application No. PCT/KR2010/004765, filed on Jul. 21, 2010, which claims the benefit of earlier filing date and right of priority to Korean Application No. 10-2009-0096212, filed on Oct. 9, 2009, and also claims the benefit of U.S. Provisional Application Nos. 61/327,075, filed on Apr. 22, 2010, 61/289,394, filed on Dec. 23, 2009, 61/264,839, filed on Nov. 30, 2009, and 61/227,074, filed on Jul. 21, 2009, the contents of which are all hereby incorporated by reference herein in their entirety.

TECHNICAL FIELD

The present invention relates to a wireless communication system, and more particularly, to an apparatus and method for transmitting channel state information in a wireless communication system.

BACKGROUND ART

In a 3rd Generation Partnership Project (3GPP) Long Term Evolution (LTE) system, a User Equipment (UE) connected to a Base Station (BS) measures the Reference Signal Received Power (RSRP) of the BS, evaluates a downlink channel state using the RSRP, and reports the downlink channel state to the BS, periodically or in an event-triggered manner. The downlink channel state information (or downlink channel information) may include a Channel Quality Indication (CQI), a Precoding Matrix Index (PMI), and a Rank Indication (RI). The UE transmits all or some of the CQI, PMI and RI according to transmission mode.

The BS determines time and frequency resources and a Modulation and Coding Scheme (MCS) for data transmission to the UE based on the received downlink channel state information.

The CQI is determined based on the quality of a signal received at the UE. In general, the CQI is determined based on the measurement of a Reference Signal (RS) received at the UE.

The UE may report the channel state information periodically (periodic reporting), or aperiodically upon request of the BS (aperiodic reporting).

In case of aperiodic reporting, when the BS requests reporting of channel state information to the UE, the UE transmits the channel state information to the BS on a Physical Uplink Shared CHannel (PUSCH).

In case of periodic reporting, when the BS notifies the UE of a transmission period of channel state information and a transmission offset for use in the transmission period, the UE transmits channel state information on a Physical Uplink Control CHannel (PUCCH) during the transmission period. If there is uplink data to be transmitted together with the channel state information in a subframe, the UE may transmit both the channel state information and the data on a PUSCH.

Depending on CQI feedback types and PMI feedback types, four reporting modes are available for periodic reporting. Table 1 below illustrates the four periodic reporting modes of channel state information.

TABLE 1

| | | PUCCH Feedback Type | |
|---|---|---|---|
| | | No PMI | Single PMI |
| PUCCH CQI Feedback Type | Wideband (Wideband CQI) | Mode 1-0 | Mode 1-1 |
| | UE Selected (subband CQI) | Mode 2-0 | Mode 2-1 |

The CQI feedback types are WideBand (WB) CQI and SubBand (SB) CQI, and the PMI feedback types are No PMI and Single PMI depending on whether a PMI is transmitted or not. A WB CQI refers to the CQI of a total frequency band available to the UE, whereas an SB CQI refers to the CQI of part of the total frequency band. The UE may or may not transmit a PMI to the BS. The UE may receive information about a transmission period and offset of channel state information by higher-layer signaling (Radio Resource Control (RRC) signaling).

FIG. 1 illustrates a method for transmitting channel information at a UE, when a transmission period and offset of channel state information is 5 and 1, respectively.

Referring to FIG. 1, if the transmission period of channel state information is 5, the UE transmits channel state information in every 5 subframes. For a transmission offset of 1, the transmission of the channel state information starts in the first subframe counted from subframe 0 in an ascending order of subframe indexes, that is, in subframe 1. Thus, the UE transmits the channel state information on a PUCCH in subframes 1 and 6.

Specifically, the UE transmits an average CQI of subframes 1 to 5 or the CQI of any of subframes 1 to 5 in subframe 6. Or the UE may transmit an average CQI of an arbitrary period selected from subframes 1 to 5.

The indexes of subframes are given as combinations of the number of system frames, of and the indexes of 20 slots per system frame, ns. Since one subframe includes two slots, the index of a subframe may be expressed as $10 \times n_f + \text{floor}(n_s/2)$.

The UE transmits only a WB CQI or both a WB CQI and an SB CQI. FIG. 2 illustrates resources along a frequency axis.

Referring to FIG. 2, a total frequency band includes 16 Resource Blocks (RBs). The total frequency band is divided into two Bandwidth Parts (BPs), each BP having two SBs. Thus, each SB includes four RBs. The number of BPs and the size of each SB depend on the number of RBs included in a system frequency band, and the number of SBs per BP is determined according to the number of RBs, the number of BPs, and the size of each SB.

In a CQI feedback type of transmitting both a WB CQI and an SB CQI, the WB CQI is first transmitted in a CQI transmission subframe, the CQI of an SB in the better state between SB0 and SB1 in BP0 is transmitted in the second CQI transmission subframe, and the CQI of an SB in the better state between SB0 and SB1 in BP1 is transmitted in the third CQI transmission subframe.

Specifically, the CQIs of the two BPs are sequentially transmitted after transmission of the WB CQI. During the time interval between two subframes carrying WB CQIs, the CQIs of the BPs may be sequentially transmitted once to four times. For example, if the CQI of each BP CQI is transmitted once during the time interval between two subframes carrying WB CQIs, CQIs are transmitted in the order of WB CQI, BP0 CQI, BP1 CQI, and WB CQI. If the CQI of each BP CQI is transmitted four times during the time interval between two subframes carrying WB CQIs, CQIs are transmitted in the order of WB CQI, BP0 CQI, BP1 CQI, BP0 CQI, BP1 CQI, BP0 CQI, BP1 CQI, BP0 CQI, BP1 CQI, and WB CQI.

FIG. 3 illustrates a case where both a WB CQI and an SB CQI are transmitted.

In the illustrated case of FIG. 3, a CQI transmission period is 5, a CQI transmission offset is 1, and the CQI of each BP is transmitted once during the time interval between two subframes carrying WB CQIs.

The number of sequential transmissions of the CQI of each BP between two subframes carrying WB CQIs is indicated by higher-layer signaling.

If a PMI is also transmitted, a PMI and a CQI are transmitted together. In the presence of a PUSCH to carry uplink data in a transmission subframe, the PMI and the CQI are transmitted along with data on the PUSCH.

With regards to RI transmission, the BS notifies the UE of a transmission period of an RI and an offset for the transmission period. The transmission period of an RI is given as a multiple number of the transmission period of a WB CQI, and the RI transmission offset is a value relative to a CQI transmission offset. For example, if a CQI transmission offset is 1 and an RI transmission offset is 0, the CQI and the RI have an identical offset. The RI transmission offset is 0 or a negative-signed value.

FIG. 4 illustrates a case where an RI transmission period being a multiple of a WB CQI transmission period is 1 and an RI transmission offset is −1.

Because the RI transmission period is one multiple of the WB CQI transmission period, the RI transmission period is equal to the WB CQI transmission period. Given an RI offset of −1, an RI is transmitted in subframe 0 in FIG. 3.

Heterogeneous systems with various types of small base stations such as relays and femtocells as well as legacy BSs have recently been discussed. Inter-cell coordinating communication such as simultaneous transmission of a signal to a single UE from a plurality of coordinating BSs or suspended transmission of neighbor cells to reduce interference at a cell boundary is another recent study area. In a heterogeneous system or inter-cell cooperative communication, a UE may experience an interfering link whose configuration and state may greatly change in time and frequency.

However, the conventional method for transmitting channel state information degrades system performance because a UE measures channel quality along the time and frequency axes with no regard to an interfering link and reports the channel quality to a BS.

DISCLOSURE

Technical Problem

An object of the present invention devised to solve the problem lies on a UE apparatus for transmitting channel state information in a wireless communication system.

Another object of the present invention devised to solve the problem lies on a method for transmitting channel state information in a wireless communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for transmitting channel state information at a UE in a wireless communication system, including measuring a channel state based on a level of interference caused by one or more neighbor cells, generating channel state information for each of a plurality of resource regions divided according to a predefined rule using the measured channel state and offset values received from a serving BS, the offset values being set for the each resource region, and transmitting the generated channel state information to the serving BS.

The offset values may be used for calculating a ratio of a Physical Downlink Shared CHannel (PDSCH) Energy Per Resource Element (EPRE) to a Common Reference Signal (CRS) EPRE in a specific resource region unit.

The predefined rule is based on the level of interference caused by the one or more neighbor cells or a coordination scheme between BSs.

The each resource region may be one of a subframe unit, a resource block unit, a subband unit, and a component carrier unit.

The offset values may be different for the each resource region.

The offset values may be different for the periodic and aperiodic channel state information reporting modes.

The offset values may be received from the serving BS by higher-layer signaling.

In another aspect of the present invention, provided herein is a UE apparatus for transmitting channel state information in a wireless communication system, including a channel state measurement module for measuring a channel state based on a level of interference caused by one or more neighbor cell, a channel state information generation module for generating channel state information for each of a plurality of resource regions using the measured channel state and offset values received from a serving BS, the offset values being set for the each resource region, and a transmission module for transmitting the generated channel state information to the serving BS.

Advantageous Effects

According to exemplary embodiments of the present invention, a UE reports channel state information about a plurality of time and frequency regions divided according to the state of an interference link experienced by the UE to a BS. Therefore, system performance can be increased.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates the configuration of an Evolved Universal Mobile Telecommunications System (E-UMTS) network as an example of a mobile communication system.

FIG. 6 illustrates the structure of a radio frame in a 3rd Generation Partnership Project (3GPP) Long Term Evolution (LTE) system as an example of a mobile communication system.

FIG. 7 illustrates the structures of downlink and uplink subframes in the 3GPP LTE system.

FIG. 8 illustrates a downlink time-frequency resource grid structure according to the present invention.

FIG. 9 illustrates a plurality of resource regions defined in time and a plurality of resource regions defined in frequency, for measuring channel state information by a UE.

FIG. 10 illustrates a situation in which relays interfere with a UE.

FIG. 11 illustrates a time-frequency area available to a UE divided into two resource regions according to an exemplary embodiment of the present invention.

FIG. 12 illustrates division of a time-frequency area available to a UE in different manners according to areas of a cell.

FIG. 13 illustrates a case where a UE is affected by two nodes.

FIG. 14 is a diagram illustrating a signal flow for a method for transmitting channel state information, when a Base Station (BS) transmits resource partitioning information according to an exemplary embodiment of the present invention.

FIG. 17 is a block diagram of a signal transmission and reception apparatus according to the present invention.

BEST MODE

Figure 1:
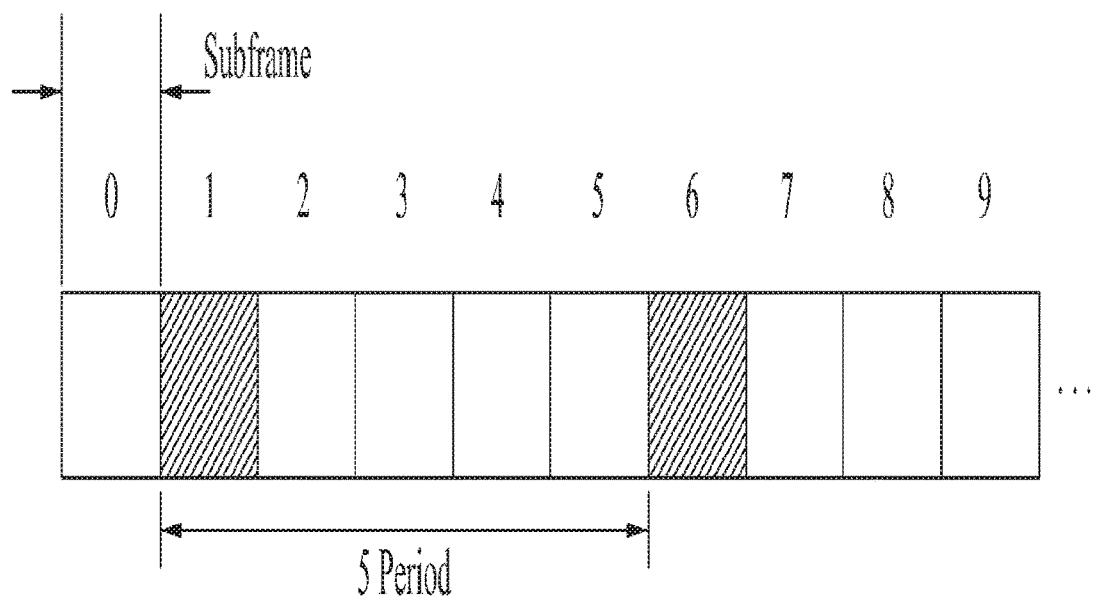
FIG. 1 illustrates a method for transmitting channel state information at a User Equipment (UE), when a transmission period and offset of the channel state information is 5 and 1, respectively.
Figure 2:
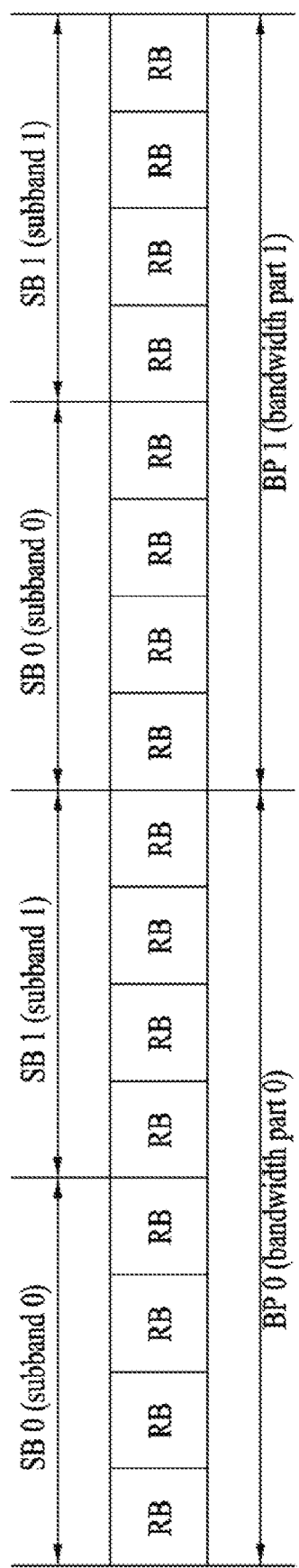
FIG. 2 illustrates resources along a frequency axis.
Figure 3:
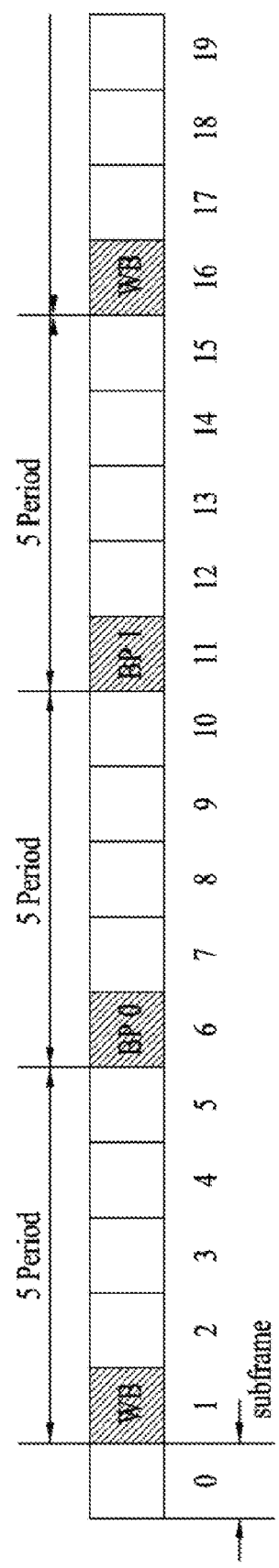
FIG. 3 illustrates a case where both a WideBand (WB) Channel Quality Indication (CQI) and a SubBand (SB) CQI are transmitted.
Figure 4:
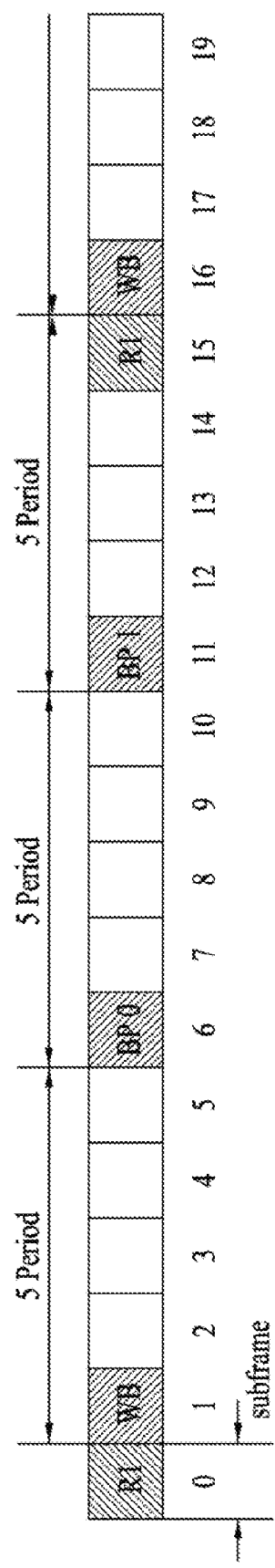
FIG. 4 illustrates a case where a Rank Indication (RI) transmission period being a multiple of a WB CQI transmission period is 1 and an RI transmission offset is −1.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a 3rd Generation Partnership Project (3GPP) Long Term Evolution (LTE) or Long Term Evolution-Advanced (LTE-A) system. However, the description is applicable to any other mobile communication system except for specific features inherent to the 3GPP LTE and LTE-A systems.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE. Relay is called as relay node (RN), or relay station (RS), etc.

When it is said that a certain part "includes" some element, this means that the certain part may include any other element unless otherwise specified, rather than it does not exclude any other element, across the specification. The term "unit", "er(or)" or "module" refers to a unit of performing at least one function or operation, which can be realized in hardware, software, or both.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

FIG. 5 illustrates the configuration of an Evolved Universal Mobile Telecommunication System (E-UMTS) network as an example of a mobile communication system.

E-UMTS is an evolution of the legacy Universal Mobile Telecommunication System (UMTS). The 3GPP working group is working on basic standardization of E-UMTS. E-UMTS is also called LTE. Details of the technical specifications of UMTS and E-UMTS can be referred to in Release 7 and Release 8 of "3rd Generation Partnership Project; Technical Specification Group Radio Access Network", respectively.

Referring to FIG. 5, the E-UMTS system includes a UE 120, eNode Bs 110a and 110b, and an Access Gateway (AG) at an end of an E-UMTS Terrestrial Radio Access Network (E-UTAN), connected to an external network. An eNode B may simultaneously transmit multiple data streams to provide a broadcast service, a multicast service, and/or a unicast service.

One eNode B covers one or more cells. A cell provides UEs with downlink or uplink transmission services in an allocated bandwidth of 1.25, 2.5, 5, 10, 15 or 20 MHz. Different cells may operate in different bandwidths. An eNode B controls data transmission and reception of a plurality of UEs. The eNode B transmits downlink scheduling information for downlink data to a UE, thus notifying a time-frequency area, a coding scheme, a data size, and Hybrid Automatic Repeat reQuest (HARQ) information of the downlink data. Also, the eNode B transmits information about a time-frequency area, a coding scheme, a data size, and HARQ information for uplink data transmission of the UE by uplink scheduling information. An interface for transmitting user traffic or control traffic may be established between eNode Bs. A Core Network (CN) may include an AG and a network node for user registration of UEs. The AG manages the mobility of UEs on a Tracking Area (TA) basis. A TA includes a plurality of cells.

FIG. 6 illustrates the structure of a radio frame in a 3rd Generation Partnership Project (3GPP) Long Term Evolution (LTE) system as an example of a mobile communication system.

Referring to FIG. 6, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 7 illustrates the structures of downlink and uplink subframes in the 3GPP LTE system.

Referring to the FIG. 7(a), a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

Now, a PDCCH that is a downlink physical channel will be described.

The PDCCH can carry a PDSCH's resource assignment and transport format (referred to as a downlink grant), PUSCH's resource assignment information (referred to as an uplink grant), a transmit power control command for individual UEs within any UE group, activation of a voice over Internet (VoIP), etc. A plurality of PDCCHs can be transmitted in a control region, and the UE can monitor the plurality of PDCCHs. The PDCCH consists of an aggregation of one or several consecutive control channel elements (CCEs). The PDCCH consisting of the aggregation of one or several consecutive CCEs can be transmitted on a control region after being processed with subblock interleaving. The CCE is a logical assignment unit used to provide the PDCCH with a coding rate depending on a wireless channel condition. The CCE corresponds to a plurality of resource element groups. According to an association relation between the number of CCEs and a coding rate provided by the CCEs, a format of the PDCCH and the number of bits of an available PDCCH are determined.

Control information transmitted over the PDCCH is referred to as downlink control information (DCI). The following table shows the DCI according to a DCI format.

TABLE 2

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI form at 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates uplink resource assignment information. DCI formats 1 to 2 indicate downlink resource assignment information. DCI formats 3 and 3A indicate an uplink transmit power control (TPC) command for any UE groups.

The following table shows information elements included in the DCI format 0 that is uplink resource assignment information (or an uplink grant). Section 5.3.3.1 of the 3GPP TS 36.212 V8.3.0 (2008-05) "Technical Specification Group Radio Access Network; Evolved Universal Terrestrial Radio Access (E-UTRA); Multiplexing and channel coding (Release 8)" may be incorporated herein by reference.

Referring to the FIG. 7(b), an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

FIG. 8 illustrates a downlink time-frequency resource grid structure according to the present invention.

Referring to the FIG. 8, The transmitted signal in each slot is described by a resource grid of $N_{RB}^{DL} \times N_{SC}^{RB}$ subcarriers and $N_{symb}^{DL}$ OFDM symbols. Here, $N_{RB}^{DL}$ represents for the number of resource blocks (RBs) for downlink, $N_{SC}^{RB}$ represents for the number of subcarriers constituting a RB, and $N_{symb}^{DL}$ represents for the number of OFDM symbols in a downlink slot. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$ where $N_{RB}^{min,DL}$ and $N_{RB}^{max,DL}$, though not limited to these values, are the smallest and largest downlink bandwidth, respectively. Here, $N_{RB}^{min,DL}$ is the minimum downlink bandwidth and $N_{RB}^{max,RB}$ the maximum downlink bandwidth supported by the wireless communication system. The number of OFDM symbols in a slot depends on the cyclic prefix (CP) length and subcarrier spacing. In case of multi-antenna transmission, there may be one resource grid defined per antenna port.

Each element in the resource grid for antenna port p is called a resource element and is uniquely identified by the index pair (k,l) in a slot where k=0, . . . , $N_{RB}^{DL}N_{SC}^{RB}-1$ and l=0, . . . , $N_{symb}^{DL}-1$ are the indices in the frequency and time domains, respectively.

Resource blocks shown in FIG. 8 are used to describe the mapping of certain physical channels to resource elements. RB is classified into physical resource block (PRB) and virtual resource block (VRB).

A physical resource block is defined as $N_{symb}^{DL}$ consecutive OFDM symbols in the time domain and $N_{SC}^{RB}$ consecutive subcarriers in the frequency domain, where $N_{symb}^{DL}$ and $N_{SC}^{RB}$ may be given by Table 3. A physical resource block thus consists of $N_{symb}^{DL} \times N_{sc}^{RB}$ resource elements, corresponding to one slot in the time domain and 180 kHz in the frequency

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

Physical resource blocks are numbered from 0 to $N_{RB}^{DL}-1$ in the frequency domain. The relation between the physical resource block number in the frequency domain and resource elements (k,l) in a slot is given by $$n_{PRB} = \left\lfloor \frac{k}{N_{sc}^{RB}} \right\rfloor$$

A VRB can have the same size as that of the PRB. There are two types of VRBs defined, the first one being a localized type and the second one being a distributed type. For each VRB type, a pair of VRBs have a single VRB index in common (may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ belonging to a second one of the two slots are likewise each assigned any one index of 0 to $N_{RB}^{DL}-1$.

With the introduction of a function of relaying a signal on a link between a BS and a UE to a relay, two links having different attributes apply to each of downlink and uplink carrier frequency bands in an LTE-A system. A link between the BS and the relay is defined as a backhaul link. A backhaul link through which a signal is transmitted using downlink resources in Frequency Division Duplex (FDD) or Time Division Duplex (TDD) is called a backhaul downlink, whereas a link through which a signal is transmitted using uplink resources in FDD or TDD is called a backhaul uplink.

Methods for transmitting and receiving channel state information according to exemplary embodiments of the present invention will be described below.

According to an exemplary embodiment of the present invention, a resource region (a time-frequency area) available to a UE may be divided into a plurality of resource regions (resource partitions) according to the state of an interfering link that the UE experiences, and the UE may generate and transmit channel state information about each of the resource regions to a BS. Resource partitioning information indicating how the time-frequency area available to the UE is divided may be signaled to the UE by the BS or may be known to both the UE and the BS in advance.

FIG. 9 illustrates a plurality of resource regions divided in time and a plurality of resource regions divided in frequency, for measuring channel state information by a UE.

Referring to FIG. 9, the UE may generate channel state information about each of a plurality of resource regions that have been defined according to the state of an interfering link experienced by the UE. The UE may generate channel state information about a slashed part and channel state information about a blank part and transmit the channel state information to the BS in FIG. 9. While a plurality of resource regions for measuring channel state information are defined in time and in frequency in FIG. 9, a predetermined number of resource regions for measuring channel state information by the UE may be defined in a time-frequency area according to the state of an interfering link experienced by the UE. The interfering link is a path in which the UE is interfered by a neighbor BS, a neighbor femtocell, or a neighbor relay.

A method for measuring channel state information at a UE will be described below, taking an example of a case where the UE is interfered by a relay.

Relays have been introduced in order to expand coverage and increase throughput. However, a relay within the coverage of a conventional BS may cause additional interference. Especially the relay significantly interferes with a UE which is located near to the coverage of the relay but which is not serviced by the relay. The configuration and state of the interfering link that the UE experiences vary depending on whether the neighbor relay transmits a downlink signal or not.

There are two types of relays, half-duplex relays and full-duplex relays. A half-duplex relay cannot perform transmission and reception simultaneously in the same frequency band, whereas a full-duplex relay can perform transmission and reception simultaneously in the same frequency band. The full-duplex relay may not be preferable in terms of cost because it causes self-interference. Therefore, it is preferred that in order to receive a downlink signal from a BS in a subframe, a relay discontinues transmission in the subframe. The transmission discontinuation may mean that the relay blanks the subframe. The relay may transmit no signal by blanking the entire subframe, or the relay may transmit a downlink control signal to UEs connected to the relay in a certain starting part of the subframe and blanks the remaining ending part of the subframe. The relay receives a downlink signal from the BS in the blank part. In an exemplary embodiment of the present invention, a system with half-duplex relays is described.

In the case of a half-duplex relay, the configuration and state of an interfering link experienced by a UE near to the coverage of the relay vary depending on whether the relay transmits a downlink signal. Accordingly, a time-frequency area used for the UE is divided into a plurality of resource regions according to a change in the interfering link and the UE generates channel state information about each of the resource regions.

FIG. 10 illustrates a situation in which relays interfere with a UE.

FIG. 10(a) illustrates a case where two neighbor relays, Relay 2 and Relay 3 transmit downlink signals to UE 1, UE 2 and UE 3, FIG. 10(b) illustrates a case where the two neighbor relays Relay 2 and Relay 3 receive downlink signals from a first eNB, eNB 1, FIG. 10(c) illustrates a case where Relay 2 transmits a downlink signal and Relay 3 receives a downlink signal from eNB 1, and FIG. 10(d) illustrates a case where Relay 3 transmits a downlink signal and Relay 2 receives a downlink signal from eNB 1.

Referring to FIG. 10(a), the neighbor relays, that is, Relay 2 and Relay 3 interfere with UE 1 most, when they transmit downlink signals to UEs that they serve. Referring to FIG. 10(b), when Relay 2 and Relay 3 receive downlink signals from eNB 1, they interfere with UE 1 least because the downlink signals received from eNB 1 at Relay 2, Relay 3 and UE 1 are multiplexed.

As illustrated in FIGS. 10(a) and 10(b), when Relay 2 and Relay 3 transmit downlink signals to the UEs that they serve and at the same time, UE 1 receive a downlink signal from eNB 1, a time-frequency area available to UE 1 may be divided into two resource regions.

Specifically, the time-frequency area available to UE 1 may be divided into a subframe carrying downlink signals from Relay 2 and Relay 3 to UEs that they serve and a subframe carrying a downlink signal from eNB 1 to Relay 2 and Relay 3.

Referring to FIGS. 10(c) and 10(d), if Relay 2 and Relay 3 receive downlink signals from eNB 1 at different points of time, the time-frequency area of UE 1 may be divided into two or more resource regions according to the time points when Relay 2 and Relay 3 receive downlink signals from eNB 1.

FIG. 11 illustrates a case where a time-frequency area used by a UE is divided into two resource regions according to an exemplary embodiment of the present invention.

In the case where relays adjacent to the UEs simultaneously transmit downlink signals to UEs that they serve and the UE simultaneously receives a downlink signal from an eNB as illustrated in FIGS. 10(a) and 10(b), the time-frequency area used by the UE may be divided into two resource regions, as illustrated in FIG. 11.

In the LTE-A system under discussion, it is regulated that particular subframes should not be used for signal transmission from a BS to a relay, that is, for backhaul transmission. For example, a BS is not supposed to perform backhaul transmission to a relay in subframes with indexes 0, 4, 5 and 9 in an FDD system and in subframes with indexes 0, 1, 5 and 6 in a TDD system.

The relay transmits a downlink signal to UEs that it serves in subframes that the eNB does not use for backhaul transmission (i.e. slashed subframes in FIG. 11). Hence, a UE that is located near to the relay but not serviced by the relay is interfered significantly in the non-backhaul subframes.

Accordingly, the time-frequency area of the UE may be divided into subframes 0, 4, 5 and 9 and subframes 1, 2, 3, 6, 7 and 8 in the FDD system. The UE generates channel state information about subframes 0, 4, 5 and 9 and channel state information about subframes 1, 2, 3, 6, 7 and 8 and transmits the channel state information to the BS.

Since the channel state of subframes 1, 2, 3, 6, 7 and 8 will be better than the channel state of subframes 0, 4, 5 and 9, if channel state information is generated across the entire subframes, subframes 0 to 9 and transmitted to the BS as in the conventional technology, system performance is degraded. In contrast, if channel state information is separately generated for subframes 1, 2, 3, 6, 7 and 8 and for subframes 0, 4, 5 and 9 and transmitted according to the exemplary embodiment of the present invention, the BS may transmit data at a higher MCS level in subframes 1, 2, 3, 6, 7 and 8. The UE may transmit an average channel state value of 1, 2, 3, 6, 7 and 8 and an average channel state value of 0, 4, 5 and 9 to the BS. Or the UE may generate channel state information about each resource region (i.e. the slashed region and the blank region in FIG. 11) on a subframe basis and transmit the channel state information of each subframe to the BS.

The same resource partitioning criterion may apply to all UEs within a cell or different resource partitioning criteria may apply to different UEs in the cell.

FIG. 12 illustrates division of a time-frequency area used by a UE in different manners according to areas of a cell.

If a cell is divided into a plurality of areas and a relay has a different backhaul transmission time on an area basis, a time-frequency area used by a UE may be divided based on different criteria according to the areas of the cell.

While it is described that a relay interferes with a UE in the exemplary embodiment of the present invention, this is a mere exemplary application and does not limit the present invention. The present invention is applicable to every case in which the configuration and state of an interfering link experienced by a UE changes in time and frequency in view of femtocells or coordinated communication.

FIG. 13 illustrates a case where a UE is affected by two nodes.

Referring to FIG. 13, if the state of an interfering link experienced by the UE changes in time and frequency due to the influence of two nodes, the UE may divide its time-frequency area into a plurality of resource areas and transmit channel state information about each resource region to a BS.

Herein, the UE may transmit all or some of the channel state information about the plurality of resource regions to the BS.

In the case where all of the channel state information about the plurality of resource regions, the UE transmits the channel state information about each resource region to the BS at a time point set by the BS. For example, if the BS signals a CQI transmission period of 5 and a CQI transmission offset of 0 to the UE, the UE transmits the channel state information about the resource regions in subframes 0 and 5, respectively.

The UE may set the channel information about one of the plurality of resource regions as a representative value and transmits the channel state information about the other resource regions in the form of differences from the representative value.

Also, the UE may selectively transmit the channel state information about some of the plurality of resource regions. The eNB may notify the UE of an intended resource area about which channel state information is to be reported, or the UE may selectively transmit the channel state information about a resource region in which the UE intends to be serviced or the channel state information about a service available region to the BS.

Resource partitioning information indicating how the time-frequency area of the UE is divided may be signaled to the UE by the BS or may be known to both the UE and the BS in advanced.

With reference to FIG. 14, a description will be made of a method for transmitting channel state information in the case where a BS signals resource partitioning information to a UE according to an exemplary embodiment of the present invention.

FIG. 14 is a diagram illustrating a signal flow for a method for transmitting channel state information, when a BS transmits resource partitioning information a UE according to an exemplary embodiment of the present invention.

Referring to FIG. 14, the UE measures channel states between the UE and a serving BS and between the UE and neighbor nodes and transmits channel state information (e.g. RSRPs) to the BS (S1410). Then the BS identifies neighbor nodes interfering with the UE, based on the received channel state information and generates resource partitioning information by determining a subframe carrying a downlink signal from the interfering neighbor nodes (S1420).

The BS transmits the resource partitioning information to the UE (S1430). The resource partitioning information may take various forms according to system implementation. For example, a plurality of resource partitioning patterns are preset and the BS notifies the UE of a resource partitioning pattern selected from among the resource partitioning patterns. In another example, the resource partitioning information may be a bitmap indicating units obtained by dividing a time-frequency area, for example, subframes or RBs.

The UE generates channel state information about a plurality of respective resource regions according to resource partitioning information (S1440) and transmits the channel state information to the BS (S1450).

In the above description, a BS divides a time and frequency area over which the configuration and state of an interfering link experienced by a UE changes. That is, this scheme is applicable when a BS of a macro cell can determine a particular time-frequency area in which a micro cell such as a relay cell or femtocell adjacent to a UE causes interference to the UE.

Now a description will be made of a method for dividing a time-frequency area into a plurality of resource regions, for generating different types of feedbacks, generating resource partitioning information about the resource regions, and transmitting the resource partitioning information to a BS by a UE. The UE-initiated resource partitioning method is applicable even when a macro cell does not have knowledge of resources used for downlink transmission by a micro cell interfering with a UE.

Figure 15:
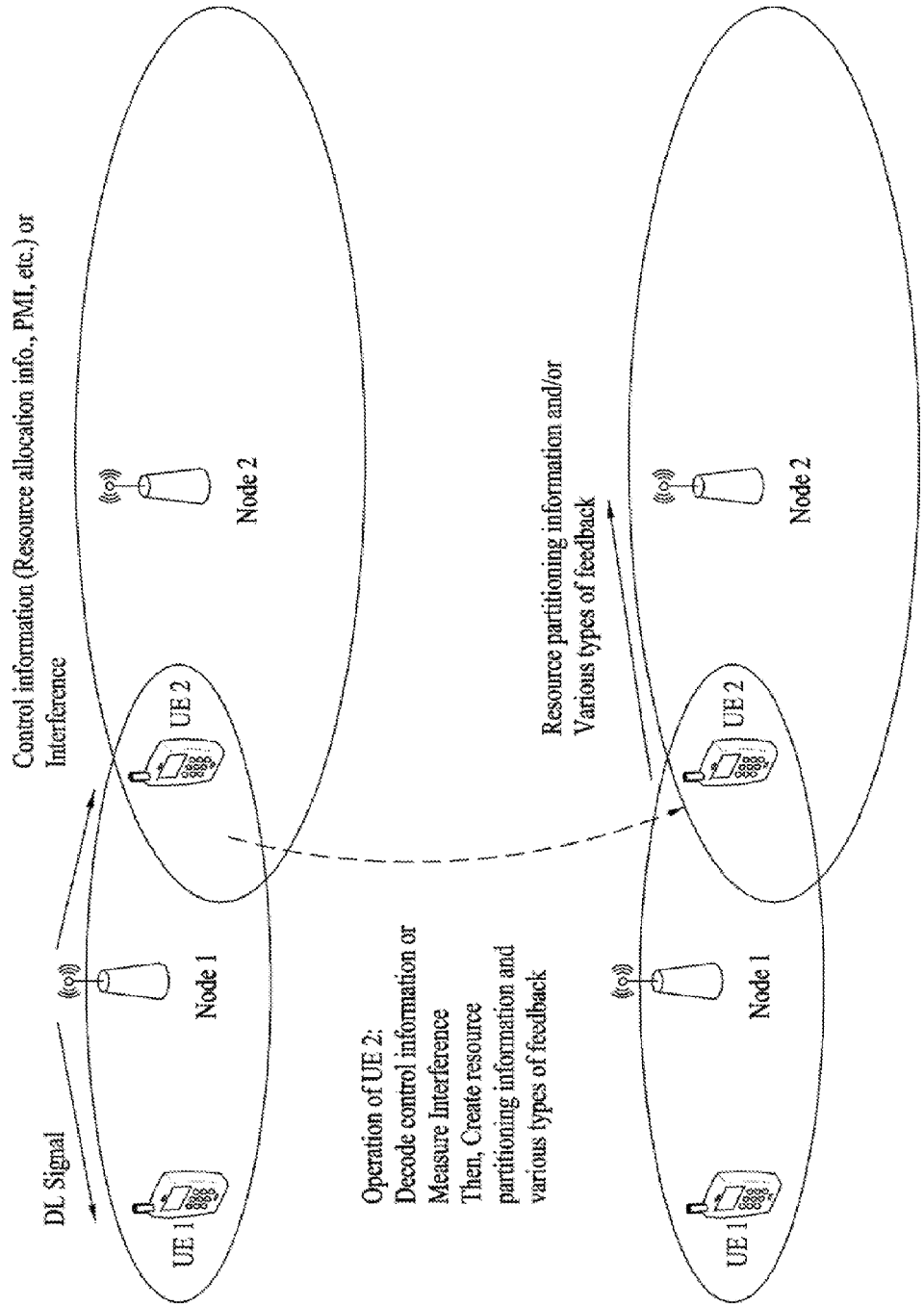
FIG. 15 illustrates a method for transmitting channel state information by a UE according to an exemplary embodiment of the present invention.

FIG. 15 illustrates a method for transmitting channel state information at a UE according to an exemplary embodiment of the present invention.

In a method for dividing a resource region in which the configuration and state of an interfering link changes by a UE, the UE may measure the magnitude of interference on a subframe basis or on an RB basis and divide a resource region according to a change in the interference magnitude. The change of interference magnitude caused by a channel change may not be clearly distinguished from the change of interference magnitude caused by a change in the configuration and state of the interfering link. However, two types of areas for feedback generation may be defined according to a rapid change in interference magnitude, exceeding a predetermined threshold, for example.

According to another method for dividing a resource region in which the configuration and state of an interfering link is changed by a UE, the UE may receive control information directly from a neighbor micro cell. FIG. 15 will be described on the assumption that Node 1 covers a neighbor micro cell (e.g. a femtocell or relay) and Node 2 covers a macro cell on the part of UE 2.

The micro cell may broadcast control information or may transmit the control information on a predetermined physical channel. In the former case, the micro cell may transmit the control information semi-statically, for example, in the form of system information so that even a UE (i.e. UE 2) that is not serviced by the micro cell may receive the control information. In the latter case, feedback information may be generated dynamically, compared to the case of broadcasting the control information.

In an example of transmitting control information on a physical channel, UE 2 may decode a PDCCH masked by a predetermined Radio Network Temporary Identifier (RNTI) and acquire resource allocation information from the decoded PDCCH. Or UE 2 may decode a PDCCH masked by a predetermined RNTI and acquire information from a scheduled PDSCH indicated by the decoded PDCCH. The predetermined RNTI may be a broadcasting RNTI for coordination between cells. When needed, the micro cell or the macro cell may notify UEs of an RNTI that will serve this purpose.

The control information transmitted by the micro cell may include resource allocation information for downlink transmission and additionally, PMI information related to allocated resources. If control information received by UE 2 includes only the resource allocation information of the micro cell, UE 2 may separate feedback generation areas according to resources used and resources not used for downlink transmission by the micro cell. On the other hand, if the control information received by UE 2 includes the resource allocation information and PMI of the micro cell, UE 2 may determine a PMI on its own and generate different types of feedbacks for resource regions divided based on the determined PMI and resources used and resources not used by the micro cell, so as to minimize interference caused by the micro cell's use of the PMI included in the control information.

As described above, UE 2 divides a resource region over which the configuration and state of an interfering link changes into a plurality of resource regions, generates resource partitioning information about the resource regions, generates feedbacks for the respective resource regions, and transmits the feedbacks to the BS. To enable the BS to identify the feedbacks for the respective resource regions, UE 2 may transmit the resource partitioning information and the feedbacks simultaneously or separately to the BS. Additional requirements for performing the above operations, that is, a method for transmitting different feedbacks generated for respective resource regions distinguishably to a BS, the period of transmitting resource partitioning information from a UE to the BS, and the form of the resource partitioning information have been described before.

When the UE divides a time-frequency area into two or more resource regions for which it is to estimate channel state information, the UE preferably reports the channel state information about the different resource regions in different amounts of resources. For example, if the UE experiences weak neighbor cell interference in resource region 1 and strong neighbor cell interference in resource region 2, it is preferred that the UE receives a more effective service in resource region 1 and resource region 2 is used for an exceptional case such as when the UE has too much traffic or when any other user does not exist in the cell. In this case, because resource region 1 having weak neighbor cell interference is used frequently, the channel state of resource region 1 is reported using a large amount of resources to increase the accuracy of the channel state report. On the other hand, the channel state of resource region 2 experiencing strong neighbor cell interference is reported using a small amount of resources. In this manner, channel state information can be efficiently reported using limited resources.

In accordance with the present invention, different amounts of resources are used for reporting channel state information about different resource regions, as described above. For the convenience' sake of description, it is assumed that a resource region is divided into a primary resource region having weak neighbor cell interference and a secondary resource region having strong neighbor cell interference. For example, when a UE is near to a wireless relay, a subframe in which the neighbor wireless relay discontinues its transmission to receive a backhaul signal from a BS may be a primary resource region and a subframe in which the neighbor wireless relay transmits its signal may be a secondary resource region, which should not be construed as limiting the present invention. More resource regions may be defined in the same manner.

Methods for reporting the respective channel states of primary and secondary resource regions to a BS by a UE will be described.

The UE may express channel state information about the primary resource region as an absolute CQI and channel state information about the secondary resource region as a difference ($\Delta$CQI) from the absolute CQI and report the channel state information to the BS.

In general, the difference $\Delta$CQI may be expressed in fewer bits. Because the secondary resource region experiences strong inter-cell interference, the difference $\Delta$CQI from the absolute CQI representing the channel state of the primary resource region may be less than or equal to 0. The difference $\Delta$CQI may have some special values. For example, $\Delta$CQI=0 which implies that there is no valid difference between the channel states of the primary and secondary and $\Delta$CQI=$-\infty$ which implies that a valid signal transmission is impossible in the secondary resource region due to too wide an interference difference between the primary and secondary resource regions. The two CQIs of the primary and secondary resource regions may be multiplexed at different bit positions on a single physical report channel (e.g. PUCCH).

The UE may express the channel state information about the primary resource region as a densely quantized CQI value and the channel state information about the secondary resource region as a loosely quantized CQI value. For example, a one-bit variation of the CQI value of the primary resource region may indicate a larger variation in Signal-to-Interference plus Noise Ratio (SINR) or MCS level than a one-bit variation of the CQI value of the secondary resource region.

With regards to transmission periods of the channel state information about the primary and secondary resource regions, the UE may report the channel state of the primary resource region to the BS periodically and the channel state of the secondary resource region to the BS aperiodically. For instance, the UE may report the channel state of the primary resource region at short intervals (e.g. every 10 ms) by a periodic PUCCH feedback, whereas it may report the channel state of the secondary resource region by an aperiodic PUSCH feedback, when necessary (for example, when the BS needs to schedule the UE in the secondary resource region).

If the periodic PUCCH feedback for the primary resource region occurs simultaneously with the aperiodic PUSCH feedback for the secondary resource region, the UE may transmit the two feedbacks by multiplexing them, or may report only the channel state of one resource region. If the UE transmits only one feedback, the feedback may be an aperiodic PUSCH feedback. The BS may notify the UE of the priority levels of channel state feedbacks by higher-layer signaling.

Figure 16:
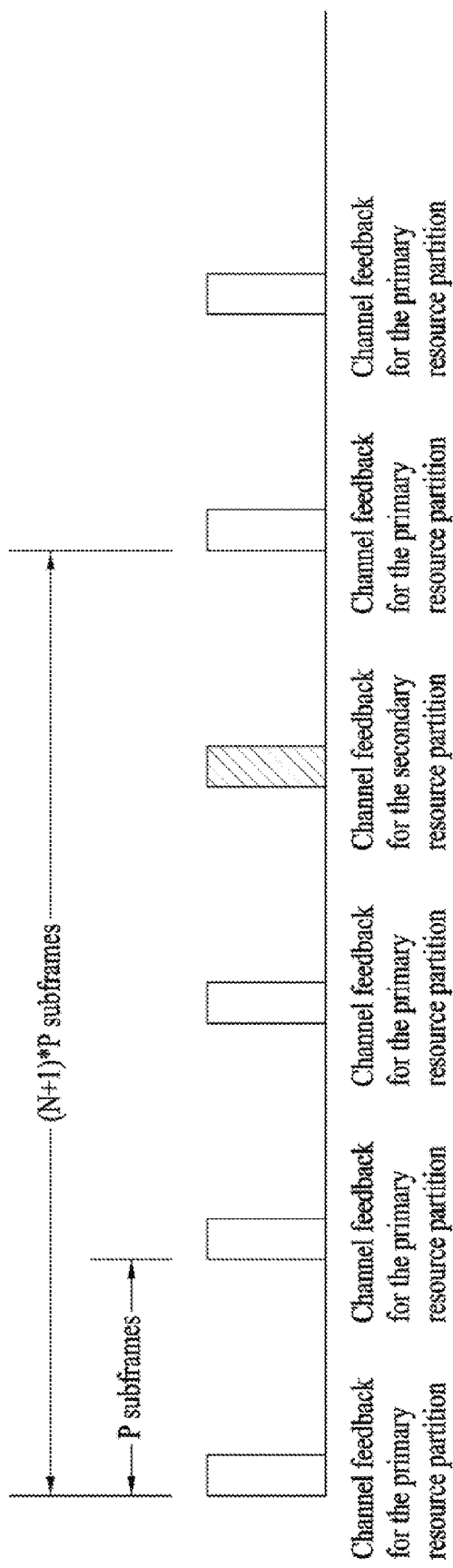
FIG. 16 illustrates a method for using allocated feedback resources by a UE an exemplary embodiment of the present invention.

Now a description will be made of methods for using allocated feedback resources at a UE. FIG. 16 illustrates a method for using allocated feedback resources at a UE according to an exemplary embodiment of the present invention.

The UE reports the channel states of two resource regions alternately in the same allocated feedback resources. The channel state of one resource region with a higher priority may be reported more frequently than the channel state of the other resource region with a lower priority in the feedback resources. For example, If periodic PUCCH feedback resources are allocated to the UE to allow the UE to report a channel state every P subframes, the UE may report the channel state of the secondary resource region once every (N+1)×P subframes after reporting the channel state of the primary resource region N times. In FIG. 16, N=3. The BS may transmit to the UE information about how often the UE is to report the channel states of the two resource regions and information about the start time of the reporting by higher-layer signaling.

In a method for utilizing different amounts of resources to report the channel states of different resource regions according to another exemplary embodiment of the present invention, the UE has an independent channel state reporting period for each resource region and if the UE is to report the channel states of the different resource regions at the same time, it may report only the channel state of one resource region. On the contrary, the UE may report the channel states of the other resource regions by multiplexing at one time, without the channel state of the one resource region.

In the case where the UE is supposed to report only the channel state of one resource region, the UE may report the channel state of a resource region for which a longest transmission period is set. If the reporting times of the channel states of different resource regions coincide, the BS may notify the UE of the reporting priority levels of the channel states of the resource regions by higher-layer signaling. For example, if periodic PUCCH feedback resources are allocated to the UE and the channel state reporting periods of the primary and second resource regions are 5 ms and 20 ms, respectively, it occurs that the channel states of the two resource regions should be reported at the same time every 20 ms. If it is regulated that the UE should transmit a report of the channel state of a resource region with a longest reporting period, the UE may transmit only a channel state report of the secondary resource region with the longer reporting period in the periodic PUCCH feedback resources to the BS.

On the other hand, when the UE does not transmit a channel state report of one resource region, it may be regulated that the UE excludes a report of the channel state of a resource region with a shortest reporting period, or the BS may notify the UE of the priority level of a resource region for which a channel state report should be excluded by higher-layer signaling.

Now a method for generating CQIs for resource regions in different manners and transmitting the CQIs to a BS by a UE will be described below.

Among parameters used for CQI generation at a UE, different values of a parameter set by higher-layer signaling are given to different resource regions and signaled to the UE so that the UE may generate a CQI independently on a resource region basis.

The BS determines a downlink transmit Energy Per Resource Element (EPRE). The ratio of PDSCH EPRE to cell-specific RS (Common RS (CRS)) EPRE among PDSCH REs for each Orthogonal Frequency Division Multiplexing (OFDM) symbol is denoted by either $\rho_A$ or $\rho_B$ according to the index of the OFDM symbol. In addition, $\rho_A$ and $\rho_B$ are UE-specific. The UE generates CQIs using $\rho_A$ and $\rho_B$ set by the BS. ρA is the ratio of PDSCH EPRE to cell-specific RS EPRE in an OFDM symbol that does not contain a CRS and $\rho_B$ is the ratio of PDSCH EPRE to cell-specific RS EPRE in an OFDM symbol containing a CRS. $\rho_A$ is determined by $$\rho_A = P_A + \Delta_{offset} + 10 \log_{10} \quad [\text{Equation 1}]$$

for any modulation scheme, if the UE is configured with transmission mode 2 (transmit diversity) with 4 cell-specific antenna ports, or transmission mode 3 (transmit diversity if the associated rank indicator (RI) is 1, otherwise large delay CDD) with 4 cell-specific antenna ports and the associated RI is equal to one.

$$\rho_A = P_A + \Delta_{offset} [dB] \quad [\text{Equation 2}]$$

for any modulation scheme and any number of layers, in different modes from the modes of [Equation 1].

In [Equation 1] and [Equation 2], $\rho_A$ is a UE-specific parameter transmitted to the UE from the BS by higher-layer signaling, and is given by a parameter nomPDSCH-RS-EPRE-Offset which is configured by higher-layer signaling. Table 4 below illustrates OFDM symbol indexes within a slot where the ratio of a PDSCH EPRE to a cell-specific RS EPRE is denoted by $\rho_A$ or $\rho_B$.

TABLE 4

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
| --- | --- | --- | --- | --- |
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

Referring to Table 4, for a normal Cyclic prefix (CP) and four antenna ports, the ratio of PDSCH EPRE to cell-specific RS EPRE in OFDM symbols with indexes 2, 3, 5 and 6 that do not contain CRSs within a slot is $\rho_A$, and the ratio of PDSCH EPRE to cell-specific RS EPRE in OFDM symbols with indexes 0, 1 and 4 containing CRSs is $\rho_B$.

As described above, the BS may set different offsets for resource regions by [Equation 1] or [Equation 2] and signals the offsets to the UE. Then the UE may generate channel state information (e.g. CQIs) for the resource regions using the offsets. Now a description will be made of a method for generating CQIs for resource regions using offsets set for the resource regions. Herein an offset is a value required to calculate $\rho_A$ by [Equation 1] or [Equation 2] during generating CQIs using by $\rho_A$ or $\rho_B$. That is, the offset is given as the parameter nomPDSCH-RS-EPRE-Offset which is configured by higher-layer signaling of the BS. As stated before, $\rho_A$ is the ratio of PDSCH EPRE to cell-specific RS EPRE in an OFDM symbol that does not contain a CRS and $\rho_B$ is the ratio of PDSCH EPRE to cell-specific RS EPRE in an OFDM symbol containing a CRS.

Embodiment 1 for Generating CQIs

When total system resources are divided in the time domain (or region) according to the magnitude of neighbor cell interference or coordination between BSs, a BS may set different offset values (or offsets) for different resource regions. For example, the BS may divide the total system resources into subframes with strong interference and subframes with weak interference according to the magnitude of neighbor cell interference and set a high offset for the subframes with the weak interference, so that a UE generates a higher CQI than might be achieved by channel estimation. That is, the BS may additionally take into account the number of a subframe for which a CQI is generated when determining offset values for the UE.

In this manner, performance of the UE is improved by correcting CQI and rank information set pessimistically relative to interference that the UE actually experiences.

When the total system resources are divided in the frequency domain according to coordination between BSs to reduce inter-cell interference, the BS may set different offset values for different RBs, subbands, or component carriers. For this operation, the BS may define a new offset value for each resource region and signal the new offset value to the UE by higher-layer signaling. Thus the UE may generate channel state information for frequency resource regions using the offset values for the frequency resource regions received from the BS by higher-layer signaling.

Embodiment 2 for Generating CQIs

The BS may set different offset values (or offsets) for different CQI reporting modes. For example, the BS may set different offset values for a periodic CQI reporting mode in which the UE transmits a CQI on a PUCCH and for an aperiodic CQI reporting mode in which the UE transmits a CQI on a PUSCH.

If different offset values are set for a UE serviced by a macro cell but interfered seriously by a micro cell such as a neighbor relay or femtocell and a UE services by a micro cell but interfered seriously by a macro cell in a specific resource region, the UEs may generate CQIs more accurately for resource regions and transmit the CQIs to the BS.

If a UE performs channel and interference measurement independently on a resource region basis, that is, on a resource partition basis, the UE may use different BS-set offset values for resource regions in generating CQIs for the resource regions. Even when the UE performs channel and interference measurement without resource partitioning, as done conventionally, it may use different BS-set offset values for different resource regions, CQI reporting modes, or CQI feedback resources in generating and reporting CQIs. The different BS-set offset values may apply to different resource regions.

For example, when the BS signals two offset values (first and second offset values) to the UE, the UE may apply the first offset value to a CQI transmitted in a specific subframe and the second offset value to a CQI transmitted in another subframe. Or when the UE transmits different CQIs alternately every predetermined period, the UE may apply the first offset value on the whole and when the predetermined period comes, the UE may apply the second offset value.

In another example, the UE may apply the first offset value in a periodic CQI reporting mode and the second offset value in an aperiodic CQI reporting mode.

In a further example, first and second channel state reporting periods may be given to two resource regions and the first offset value may apply to a CQI reported in the first channel reporting period, while the second offset value may apply to a CQI reported in the second channel reporting period. If the two CQIs are to be reported at the same time, the offset values are applied according to the priority levels of the CQIs, which may be signaled to the UE by the BS by higher-layer signaling.

If CQIs are generated using two offset values as described above, the UE may use one offset value for generating a CQI for a specific resource region with strong inter-cell interference and the other offset value for generating a CQI for the other resource region with weak inter-cell interference. Therefore, the BS may set the first and second offset values with a predetermined or larger difference between them. Also, the BS may set a specific offset value such that it is interpreted that there is no valid signal transmission in a resource region to which the UE applies the specific offset value.

In the case where channel and interference measurement is carried out without resource partitioning as described above, the BS should define resource regions according to a purpose such as coordination and set a plurality of offset values for the resource regions for the UE, but the UE has only to generate CQIs using the offset values signaled by higher-layer signaling. Thus, the channel measurement and CQI generation scheme as defined in 3GPP LTE Release 8 may still be used.

FIG. 17 is a block diagram of a signal transmission and reception apparatus according to the present invention.

Referring to FIG. 17, a signal transmission and reception apparatus 50 may be a UE or a BS. The signal transmission and reception apparatus 50 includes a processor 51, a memory 52, a Radio Frequency (RF) unit 53, a display unit 54, and a user interface unit 55.

The layers of radio interface protocols are realized in the processor 51. The processor 51 provides a control plane and a user plane. The function of each layer may be implemented in the processor 51. The memory 52 is connected to the processor 51, and stores an operating system, application programs, and general files.

The display unit 54 displays various types of information. The display unit 54 may be configured with a known component such as a Liquid Crystal Display (LCD) or an Organic Light Emitting Diode (OLED).

The user interface unit 55 may be implemented with a known user interface such as a keypad, a touch screen, etc.

The RF unit 53 is connected to the processor 51, for transmitting and receiving RF signals. The RF unit 53 may be separately configured as a transmission module (not shown) and a reception module (not shown). The processor 51 includes a channel state measurement module (not shown) and a channel state information generation module (not shown).

The layers of radio interface protocols between a UE and a network may be classified into Layers 1, 2 and 3 (L1, L2 and L3) based on the three lowest layers of the Open System Interconnection (OSI) model. A physical layer corresponds to L1 and provides an information transmission service on physical channels. An RRC layer corresponds to L3 and provides radio control resources between the UE and the network. The UE and the network exchange RRC messages through the RRC layer.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Mode for Invention

Various embodiments have been described in the best mode for carrying out the invention.

INDUSTRIAL APPLICABILITY

A method for transmitting and receiving channel state information in a wireless communication system according to the present invention are applicable to 3GPP LTE and LTE-A systems, and other systems.

The invention claimed is:
1. A method for transmitting channel state information (CSI) reporting by a user equipment in a wireless communication system, the method comprising:

when a first periodic CSI reporting for a primary component carrier occurs simultaneously with a second periodic CSI reporting for a secondary component carrier in a time interval, transmitting the first periodic CSI reporting for the primary component carrier to an eNode B in the time interval; and discarding the second periodic CSI reporting for the secondary component carrier in the time interval.

2. The method of claim 1, wherein the first periodic CSI reporting for the primary component carrier is transmitted on a physical uplink control channel (PUCCH).

3. The method of claim 1, wherein the secondary component carrier has a lower priority than the primary component carrier with respect to periodic CSI reports of different component carriers.

4. The method of claim 1, further comprising:

receiving information related to priorities of the primary component carrier and the secondary component carrier through a higher layer signaling from the eNode B.

5. A user equipment for transmitting channel state information (CSI) reporting in a wireless communication system, the user equipment comprising:

a transmitter; and a processor, wherein the processor is configured to:

when a first periodic CSI reporting for a primary component carrier occurs simultaneously with a second periodic CSI reporting for a secondary component carrier in a time interval, control the transmitter to transmit the first periodic CSI reporting for the primary component carrier to an eNode B in the time interval; and discard the second periodic CSI reporting for the secondary component carrier in the time interval.

6. The user equipment of claim 5, wherein the first periodic CSI reporting for the primary component carrier is transmitted on a physical uplink control channel (PUCCH).

7. The user equipment of claim 5, wherein the secondary component carrier has a lower priority than the primary component carrier with respect to periodic CSI reports of different component carriers.

8. The user equipment of claim 5, further comprising a receiver, wherein the processor is further configured to control the receiver to receive information related to priorities of the primary component carrier and the secondary component carrier through a higher layer signaling from the eNode B.

* * * * *